US010979858B2

(12) United States Patent
Suzuki

(10) Patent No.: US 10,979,858 B2
(45) Date of Patent: Apr. 13, 2021

(54) POSITION INFORMATION PROVIDING APPARATUS AND POSITION INFORMATION PROVIDING METHOD

(71) Applicant: Toyota Jidosha Kabushiki Kaisha, Toyota (JP)

(72) Inventor: Koichi Suzuki, Toyota (JP)

(73) Assignee: Toyota Jidosha Kabushiki Kaisha, Toyota (JP)

(\*) Notice: Subject to any disclaimer, the term of this patent is extended or adjusted under 35 U.S.C. 154(b) by 0 days.

(21) Appl. No.: 16/298,015

(22) Filed: Mar. 11, 2019

(65) Prior Publication Data
US 2019/0281417 A1    Sep. 12, 2019

(30) Foreign Application Priority Data

Mar. 12, 2018 (JP) .............................. JP2018-044246

(51) Int. Cl.
| | |
|---|---|
| *H04W 4/029* | (2018.01) |
| *H04L 12/58* | (2006.01) |
| *H04W 4/40* | (2018.01) |
| *H04W 4/02* | (2018.01) |
| *H04L 29/08* | (2006.01) |
| *H04W 4/21* | (2018.01) |
| *H04W 4/18* | (2009.01) |

(52) U.S. Cl.
CPC ............ *H04W 4/029* (2018.02); *H04L 51/32* (2013.01); *H04W 4/40* (2018.02); *H04L 67/22* (2013.01); *H04W 4/025* (2013.01); *H04W 4/185* (2013.01); *H04W 4/21* (2018.02)

(58) Field of Classification Search
CPC .......... H04L 51/32; H04L 67/22; H04W 4/21; H04W 4/40; H04W 4/025; H04W 4/029; H04W 4/185
See application file for complete search history.

(56) References Cited

U.S. PATENT DOCUMENTS

| | | | | |
|---|---|---|---|---|
| 2011/0112717 A1* | 5/2011 | Resner | ................... | G07C 5/008 |
| | | | | 701/31.4 |
| 2013/0117389 A1* | 5/2013 | Yamada | ............. | G08G 1/09675 |
| | | | | 709/206 |
| 2014/0005847 A1* | 1/2014 | Melen | ....................... | G06F 1/28 |
| | | | | 700/291 |
| 2014/0200803 A1* | 7/2014 | Kinoshita | .......... | G01C 21/3676 |
| | | | | 701/428 |

(Continued)

FOREIGN PATENT DOCUMENTS

| | | |
|---|---|---|
| JP | 2013-050919 A | 3/2013 |
| JP | 2015-103058 A | 6/2015 |

*Primary Examiner* — Jaime M Holliday
(74) *Attorney, Agent, or Firm* — Dinsmore & Shohl LLP

(57) ABSTRACT

A position information providing apparatus includes: a posting information acquisition part that acquires, from a social media service, posting information having a posting date and time and a posted text that has been posted by a user and that includes a word related to a behavior; a vehicle information acquisition part that acquires vehicle information, including travel history information, based on a vehicle ID associated with a user ID of the acquired posting information; and a position information providing part that provides the posting information with position information related to a posting, based on the acquired posting information and travel history information.

12 Claims, 2 Drawing Sheets

(56) References Cited

U.S. PATENT DOCUMENTS

2018/0253294 A1\* 9/2018 Kelly .................... G06F 8/65
2018/0365645 A1\* 12/2018 Gillen .................. G06Q 50/01
2019/0005565 A1\* 1/2019 Hu ...................... G01C 21/343

\* cited by examiner

POSITION INFORMATION PROVIDING APPARATUS AND POSITION INFORMATION PROVIDING METHOD

CROSS-REFERENCE TO RELATED APPLICATIONS

This application relates to and claims priority from Japanese Patent Application No. 2018-044246, filed on Mar. 12, 2018, the entire disclosure of which is incorporated herein by reference.

BACKGROUND

Field

The present disclosure relates to a position information providing apparatus and a position information providing method.

Description of Related Art

JP2013-050919 A discloses a technique in which position information related to a text posted on a social media service, etc. is extracted from the content of the posted text and the extracted position information is associated with the posted text. In JP2013-050919 A, when a user searches for a posted text, position information to be associated with the posted text which has been extracted by the search is identified based on the content of the extracted posted text and vehicle information (a current position and a travelling direction) of the user and the identified position information is provided to the user along with the posted text to thereby effectively use such posted text.

However, posted texts often do not include the content required to identify a position (facility or place) related to each posted text. Thus, it is often impossible to associate a posted text with position information in the technique disclosed in cited reference 1, and more improvements are needed to achieve effective use of posted texts.

SUMMARY

An object of the present disclosure is to provide a position information proving apparatus and a position information providing method capable of enhancing accuracy in providing posting information with position information related to a posting.

A position information providing apparatus according to an aspect of the present disclosure embodiments includes a position information providing part that provides posting information including a posting date and time and a posted text that has been posted by a user and that includes a word related to a behavior, with position information related to a posting, based on the posting information and vehicle information, including travel history information, of a vehicle owned by the user who made the posting.

In the above-mentioned aspect, the position information providing apparatus may further include: a storage part that stores a user ID included in the posting information and a vehicle ID included in the vehicle information in a manner associated with each other; a posting information acquisition part that acquires the posting information from an external server; and a vehicle information acquisition part that acquires the vehicle information, including the travel history information, based on the vehicle ID associated with the user ID of the acquired posting information, wherein the position information providing part provides the posting information with position information related to the posting based on the acquired posting information and the travel history information.

In the above-mentioned aspect, the position information providing apparatus may further include an identification part that identifies, from the vehicle information, the travel history information indicating that an accessory power was turned OFF before the posting date and time corresponding to the posted text, wherein the position information providing part provides the posting information with position information related to the posting based on a position included in the travel history information identified by the identification part.

In the above-mentioned aspect, the position information providing apparatus may further include an identification part that identifies, from the vehicle information, the travel history information in which a vehicle stop time period from a time when an accessory power was turned OFF before the posting date and time corresponding to the posted text to a time when the accessory power was next turned ON is equal to or longer than a minimum dwell time that has been set so as to be associated with a behavior type classified based on the word related to the behavior included in the posted text, the minimum dwell time being a minimum time expected to be required for performing the behavior in a facility, wherein the position information providing part provides the posting information with the position information related to the posting based on a position included in the travel history information identified by the identification part.

In the above-mentioned aspect, when the posted text includes a word that can be used to identify a place, the position information providing part may conduct a search using the word that can be used to identify the place in map information and employ, as the position information related to the posting, a position of a facility closest to a position included in the travel history information identified by the identification part from among facilities found by the search.

In the above-mentioned aspect, when the posted text does not include a word that can be used to identify a place, the position information providing part may conduct a search for a facility corresponding to a behavior type classified based on the word related to the behavior included in the posted text from map information and employ, as the position information related to the posting, a position of a facility closest to a position included in the travel history information identified by the identification part from among facilities found by the search.

A position information providing method according to another aspect of the present disclosure is a method executed by a processor, the method including a position information providing step of providing posting information including a posting date and time and a posted text that has been posted by a user and that includes a word related to a behavior, with position information related to a posting based on the posting information and vehicle information, including travel history information, of a vehicle owned by the user who made the posting.

DETAILED DESCRIPTION

Figure 1:
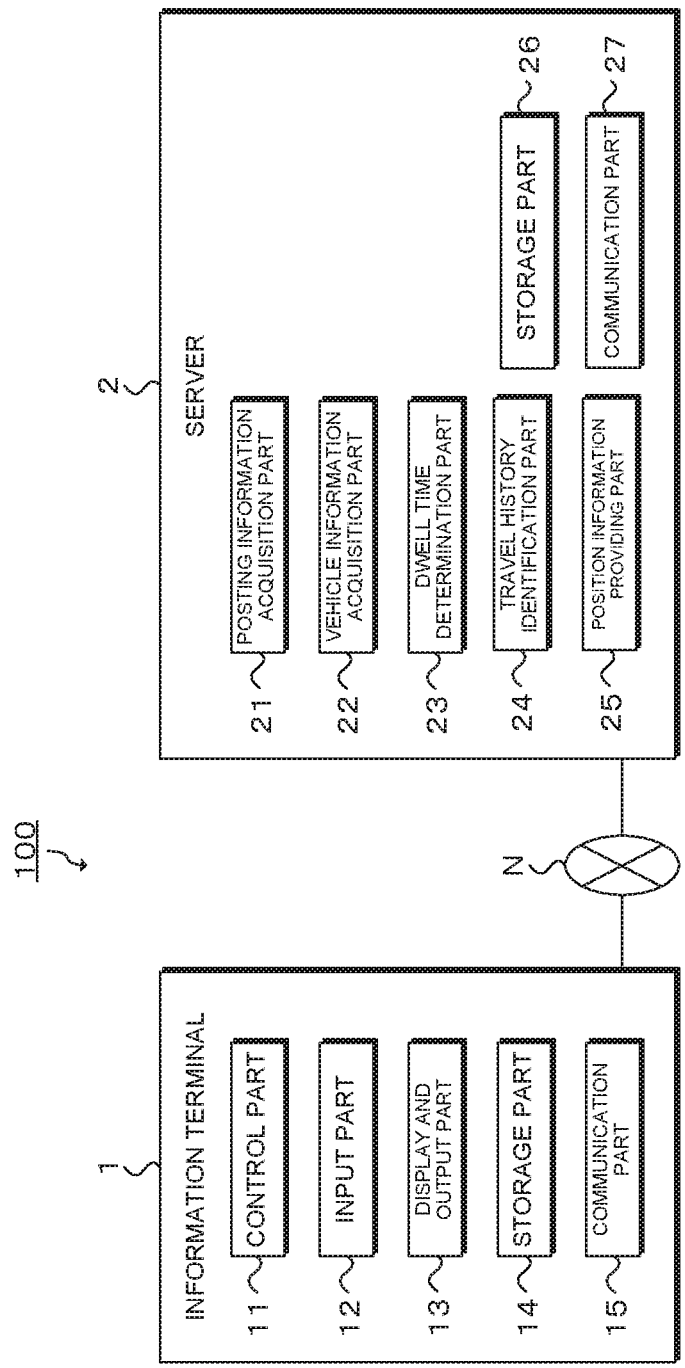
FIG. 1 is a diagram illustrating a configuration of a position information providing system including a server according to an embodiment.

Embodiments will now be described below with reference to the attached drawings. In the drawings, like reference numerals denote the same or similar configurations.

Referring to FIG. 1, the following description will describe a configuration of a position information providing system including a server (position information providing apparatus) according to an embodiment. A position information providing system 100 may include, for example, an information terminal 1 held by a user and a server 2 that manages posting information posted by the user and vehicle information of a vehicle owned by the user. The information terminal 1 and the server 2 are configured so as to be communicable with each other via a network N which may include, for example, a wireless network.

The information terminal 1 shown in FIG. 1 is a terminal device such as a smartphone. The information terminal 1 is not limited to a smartphone, and terminal devices such as tablet terminals, mobile phones, personal digital assistants, notebook computers (personal computers), in-vehicle terminals and other types of terminal devices may be used as appropriate.

The information terminal 1 may have functional configurations such as a control part 11, an input part 12, a display and output part 13, a storage part 14 and a communication part 15. The information terminal 1 may include physical configurations such as a control unit including a CPU (Central Processing Unit) and a memory, an operation part, a display, a speaker, a storage unit and a communication unit. When the CPU executes a predetermined program stored in the memory, a function of each of the control part 11, the input part 12, the display and output part 13, the storage part 14 and the communication part 15 is fulfilled.

The server 2 may have functional configurations such as a posting information acquisition part 21, a vehicle information acquisition part 22, a dwell time determination part 23, a travel history identification part 24, a position information providing part 25, a storage part 26 and a communication part 27. The server 2 may have physical configurations such as a control unit including a CPU and a memory, a storage unit and a communication unit. When the CPU executes a predetermined program stored in the memory, a function of each of the posting information acquisition part 21, the vehicle information acquisition part 22, the dwell time determination part 23, the travel history identification part 24, the position information providing part 25, the storage part 26 and the communication part 27 is fulfilled.

The storage part 26 in the server 2 manages posting information related to a posted text that a user has posted on, for example, a social media service, vehicle information related to a vehicle owned by the user and minimum dwell time information by storing such information in a database or the like.

The posting information may include, for example, a user ID for identifying a user, a posting date and time of the posted text, the content of the posted text, etc.

The vehicle information may include, for example, a vehicle ID for identifying a vehicle, travel history information of the vehicle, etc. The travel history information of the vehicle may include, for example, operation content of the vehicle, a date and time, and a position. Examples of the operation content of the vehicle may include events such as an accessory power being turned OFF, the accessory power being turned ON, etc.

The user ID of the posting information and the vehicle ID of the vehicle information are managed in a manner associated with each other. For example, the management of the user ID and the vehicle ID may be performed by registering such IDs to a table or the like in a manner associated with each other or by adding the vehicle ID to the posting information or adding the user ID to the vehicle information.

The association of the user ID of the posting information and the vehicle ID of the vehicle information may be achieved by, for example, causing relevant pieces of application software (hereinafter simply referred to as "application(s)" in some contexts) to cooperate with each other. For example, the user ID and the vehicle ID may be associated with each other by prompting the user to execute, in an application for using a position information providing system, application cooperation processing for allowing cooperation with an application for using a social media service.

The minimum dwell time information may include a behavior type, a minimum dwell time, etc. Examples of the behavior type may include "shopping" and "drinking and eating." The minimum dwell time is an estimated minimum dwell time required to perform a certain behavior in a facility and the minimum dwell time may be set as appropriate. For example, when the behavior type is "shopping," the minimum dwell time may be set to "1 hour," while when the behavior type is "drinking and eating," the minimum dwell time may be set to "30 minutes."

The posting information acquisition part 21 acquires, from a social media service, posting information including a word related to a behavior type in its posted text. Posting information may be acquired from any external servers without being limited to social media services. Examples of the words related to behaviors may include "purchase" "shopping" "ate" and others. The timing to acquire posting information from social media services may be set as appropriate. For example, the posting information may be acquired periodically or in accordance with the number of newly-posted information pieces.

The vehicle information acquisition part 22 acquires vehicle information based on the vehicle ID associated with the user ID of the posting information acquired by the posting information acquisition part 21.

The dwell time determination part 23 determines the minimum dwell time based on the behavior type which a word related to a particular behavior included in the posting information acquired by the posting information acquisition part 21 belongs to. For example, if a word related to a particular behavior is "purchase," the behavior type is "shopping" and the minimum dwell time for the "shopping" is "1 hour." If a word related to a behavior type is "ate," the behavior type is "drinking and eating" and the minimum dwell time of the "drinking and eating" is "30 minutes."

The travel history identification part 24 identifies, from vehicle information that has been acquired by the vehicle information acquisition part 22, travel history information in which a vehicle stop time period from the time when the accessory power was turned OFF at a position other than the user's house before a posting date and time of a posted text to the time when the accessory power was next turned ON, is equal to or longer than the minimum dwell time determined by the dwell time determination part 23.

For example, in a situation where: the posting date and time of a posted text was "3:50 PM on Aug. 8, 2017," the accessory power was turned OFF at "11:30 AM on Aug. 8, 2017" at a position near "XXX Outlet Park" and the accessory power was turned ON at 2:40 PM on Aug. 8, 2017," the vehicle stop time period is "3 hours and 10 minutes," which is equal to or longer than the minimum dwell time ("1 hour"). In such case, the travel history identification part 24 identifies, from the vehicle information, the travel history information indicating that the accessory power was turned OFF at the position near "XXX Outlet Park" at "11:30 AM on Aug. 8, 2017" and the travel history information indicating that the accessory power was turned ON at "2:40 PM on Aug. 8, 2017" at the position near "XXX Outlet Park."

The position information providing part 25 provides posting information with position information related to the posting, based on the posting information having a posting date and time and a posted text which has been posted by the user and which includes a word related to a particular behavior, as well as based on the vehicle information, including the travel history information, of the vehicle owned by the user who has made the posting. More specific explanation will be provided below.

First, the position information providing part 25 judges whether or not a word that can be used to identify a place is included in a posted text in the posting information acquired by the posting information acquisition part 21. Examples of the word that can be used to identify a place may include the names of facilities such as shopping malls, restaurants, stations, parks, etc.

When judging that a word that can be used to identify a place is included in the posted text, the position information providing part 25 then conducts a search in map information using the word that can be used to identify a place. The position information providing part 25 provides the posting information with a position of a facility which is closest to the position included in the travel history information identified by the travel history identification part 24 from among the facilities found by the search, as position information related to the posting.

For example, if the posted text states "I purchased clothes at an outlet store," the "outlet store" included in the posted text constitutes words that can be used to identify a place. In such case, the position information providing part 25 searches for an "outlet store" facility that exists around the position where the accessory power was turned OFF at a time near the posting date and time from the map information. The position information providing part 25 provides the posting information with the position of the "outlet store" facility found by such search, as the position information related to the posting.

On the other hand, when judging that no word that can be used to identify a place is included in the posted text, the position information providing part 25 searches for a facility corresponding to the behavior type that is classified based on a word related to the behavior included in the posted text, from the map information. The position information providing part 25 provides the position information with the position of a facility which is closest to the position included in the travel history information identified by the travel history identification part 24 from among the facilities found by the search, as position information related to the posting.

For example, if a posted text states "I purchased 'Regal' shoes," such posted text does not include a word that can be used to identify a place. In such case, the position information providing part 25 searches for a facility corresponding to the behavior type "shopping" to which the word related to the behavior "purchased" belongs, from the map information. The position information providing part 25 then provides the posting information with the position of a facility closest to the position where the accessory power was turned OFF at a time near the posting date and time, from among the facilities found by the search, as the position information related to the posting.

Figure 2:
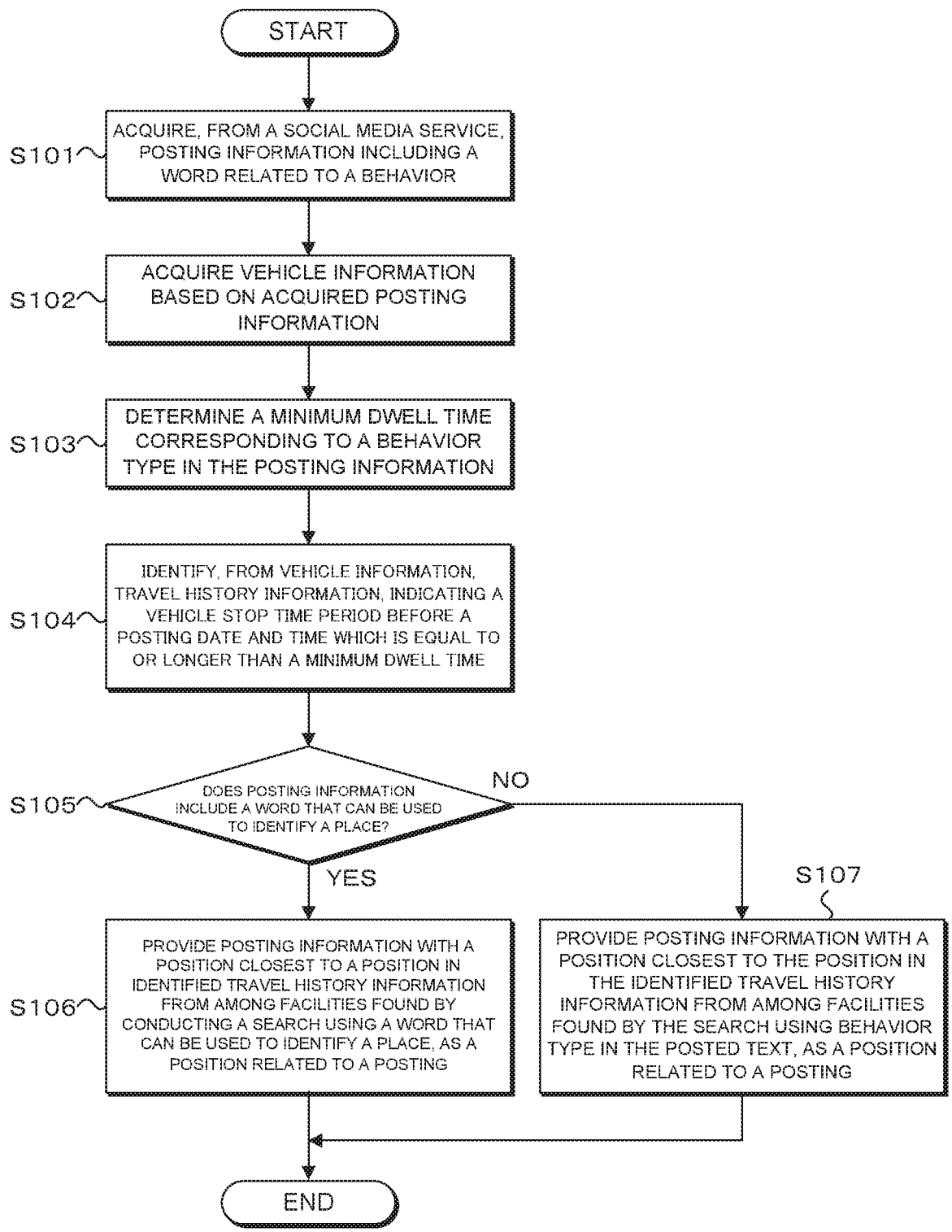
FIG. 2 is a flowchart explaining an example of operations of a server according to an embodiment.

Referring to FIG. 2, an example of operations of the server 2 according to an embodiment will now be described below.

First, the posting information acquisition part 21 in the server 2 acquires, from a social media service, posting information including a word related to a behavior (step S101).

The vehicle information acquisition part 22 in the server 2 then acquires vehicle information based on the vehicle ID associated with the user ID in the posting information acquired in step S101 (step S102).

The dwell time determination part 23 in the server 2 then determines the minimum dwell time based on the behavior type which the word related to the particular behavior included in the posting information acquired in step S101 belongs to (step S103).

The travel history identification part 24 in the server 2 identifies, from the vehicle information acquired in step S102, travel history information in which the vehicle stop time period from the time when the accessory power was turned OFF at a position other than the user's house before the posting date and time included in the posting information to the time when the accessory power was next turned ON is equal to or longer than the minimum dwell time determined in step S103 (step S104).

The position information providing part 25 in the server 2 judges whether or not a word that can be used to identify a place such as, for example, a facility name is included in a posted text in the posting information acquired in step S101 (step S105).

When judging that a word that can be used to identify a place is included in the posted text in step S105 (step S105; Yes), the position information providing part 25 in the server 2 conducts a search in the map information using the word that can be used to identify a place and provides the posting information with the position of a facility closest to the position included in the travel history information identified in step S104, from among the facilities found by the search, as the position information related to the posting (step S106), and the sequence of operations ends.

On the other hand, when judging that a word that can be used to identify a place is not included in the posted text in step S105 (step S105; No), the position information providing part 25 in the server 2 searches for a facility corresponding to the behavior type that is classified based on the word related to the behavior included in the posted text from the map information and provides the posting information with the position of a facility closest to the position included in the travel history information identified in step S104, from among the facilities found by the search, as the position information related to the posting (step S107), and the sequence of operations ends.

As described above, the position information providing system 100 according to the above embodiments is capable of: acquiring, from social media services, posting information having a posted text that has been posted by a user and includes a word related to a behavior, as well as a posting time and date; acquiring vehicle information, including travel history information, based on a vehicle ID associated with a user ID of the acquired posting information; and providing the posting information with position information related to the posting based on the acquired posting information and travel history information.

Further, the position information providing system 100 is capable of identifying from the vehicle information travel history information in which a vehicle stop time period from the time when the accessory power was turned OFF before the posting date and time of the posted text to the time when the accessory power was next turned ON is equal to or longer than the minimum dwell time that has been set so as to be associated with the behavior type of the posted text; and providing the posting information with the position information related to the posting based on the position included in the identified travel history information.

In addition, when the posted text includes a word that can be used to identify a place, the position information providing system 100 is capable of conducting a search in the map information using the word that can be used to identify a place and providing the posting information with the position of a facility closest to the position included in the identified travel history information, from among the facilities found by the search, as the position information related to the posting.

On the other hand, when the posted text does not include a word that can be used to identify a place, the position information providing system 100 is capable of searching for a facility corresponding to a behavior type in the posted text from the map information and providing the posting information with the position of a facility closest to the position included in the identified travel history information, from among the facilities found by the search, as the position information related to the posting.

Accordingly, the position information providing system 100 according to the above embodiments is capable of enhancing the accuracy in providing a posted text with the position information related to the posting.

Modifications

The present disclosure is not limited to the above-mentioned embodiments and may be implemented in various ways without departing from the gist of the disclosure. Accordingly, the above-mentioned embodiments are merely examples in every respect and should therefore not be interpreted in a limited manner. For example, the order of the above-mentioned operation steps may be rearranged as appropriate, or some operations may be performed in parallel, without causing any inconsistency with respect to the content of processing.

The components of the information terminal 1 and the server 2 are not limited to the components described in the above embodiments and an arbitrary component may be added as appropriate.

Although the server 2 may be configured as one apparatus in the above-mentioned embodiments, the functional components in the server 2 (the posting information acquisition part 21, the vehicle information acquisition part 22, the dwell time determination part 23, the travel history identification part 24, the position information providing part 25, the storage part 26 and the communication part 27) may be divided into a plurality of apparatuses. For example, the components other than the position information providing part 25, the storage part 26 and the communication part 27 may be eliminated from the configuration of the server 2 and provided separately in one or more apparatuses different from the server 2. In such case, each of the apparatuses may include the storage part 26 and the communication part 27.

According to the present disclosure, it is possible to provide a position information providing apparatus and a position information providing method capable of enhancing the accuracy in providing posting information with position information related to a posting.

What is claimed is:

1. A position information providing apparatus comprising:
a position information providing part that provides posting information of a posting with position information of the posting, the posting information related to a posted text of the posting that has been posted by a user, the posting information including a posting date and time corresponding to the posted text, the posted text including a word related to a behavior, wherein the position information is provided based on the posting information and vehicle information, including travel history information, of a vehicle owned by the user who made the posting; and
an identification part that identifies, from the vehicle information, the travel history information indicating that an accessory power was turned OFF before the posting date and time corresponding to the posted text,
wherein the position information providing part provides the posting information with position information of the posting based on a position included in the travel history information identified by the identification part, and
wherein the identification part identifies, from the vehicle information, the travel history information in which a vehicle stop time period from a time when an accessory power was turned OFF before the posting date and time corresponding to the posted text to a time when the accessory power was next turned ON is equal to or longer than a minimum dwell time that has been set so as to be associated with a behavior type classified based on the word related to the behavior included in the posted text, the minimum dwell time being a minimum time expected to be required for performing the behavior in a facility.

2. The position information providing apparatus according to claim 1, further comprising:
a storage part that stores a user ID included in the posting information and a vehicle ID included in the vehicle information in a manner associated with each other;
a posting information acquisition part that acquires the posting information from an external server; and
a vehicle information acquisition part that acquires the vehicle information, including the travel history information, based on the vehicle ID associated with the user ID of the acquired posting information,
wherein the position information providing part provides the posting information with position information of the posting based on the acquired posting information and the travel history information.

3. The position information providing apparatus according to claim 1, wherein, when the posted text includes a word that can be used to identify a place, the position information providing part conducts a search using the word that can be used to identify the place in map information and employs, as the position information of the posting, a position of a facility closest to a position included in the travel history information identified by the identification part from among facilities found by the search.

4. The position information providing apparatus according to claim 1, wherein, when the posted text includes a word that can be used to identify a place, the position information providing part conducts a search using the word that can be used to identify the place in map information and employs, as the position information of the posting, a position of a facility closest to a position included in the travel history information identified by the identification part from among facilities found by the search.

5. The position information providing apparatus according to claim 1, wherein, when the posted text does not include a word that can be used to identify a place, the position information providing part conducts a search for a facility corresponding to a behavior type classified based on the word related to the behavior included in the posted text from map information and employs, as the position information of the posting, a position of a facility closest to a position included in the travel history information identified by the identification part from among facilities found by the search.

6. The position information providing apparatus according to claim 1, wherein, when the posted text does not include a word that can be used to identify a place, the position information providing part conducts a search for a facility corresponding to a behavior type classified based on the word related to the behavior included in the posted text from map information and employs, as the position information of the posting, a position of a facility closest to a position included in the travel history information identified by the identification part from among facilities found by the search.

7. A position information providing method executed by a processor, the method comprising:
a position information providing step of providing posting information of a posting with position information of the posting, the posting information related to a posted text of the posting that has been posted by a user, the posting information including a posting date and time corresponding to the posted text, the posted text including a word related to a behavior, wherein the position information is provided based on the posting information and vehicle information, including travel history information, of a vehicle owned by the user who made the posting; and
an identification step of identifying, from the vehicle information, the travel history information indicating that an accessory power was turned OFF before the posting date and time corresponding to the posted text,
wherein the posting information is provided with position information of the posting based on a position included in the travel history information identified in the identification step, and
wherein the identification step identifies, from the vehicle information, the travel history information in which a vehicle stop time period from a time when an accessory power was turned OFF before the posting date and time corresponding to the posted text to a time when the accessory power was next turned ON is equal to or longer than a minimum dwell time that has been set so as to be associated with a behavior type classified based on the word related to the behavior included in the posted text, the minimum dwell time being a minimum time expected to be required for performing the behavior in a facility.

8. A position information providing apparatus comprising:
a position information providing part that provides posting information of a posting with position information of the posting, the posting information related to a posted text of the posting that has been posted by a user, the posting information including a posting date and time corresponding to the posted text, the posted text including a word related to a behavior, wherein the position information is provided based on the posting information and vehicle information, including travel history information, of a vehicle owned by the user who made the posting;
an identification part that identifies, from the vehicle information, the travel history information indicating that an accessory power was turned OFF before the posting date and time corresponding to the posted text;
a storage part that stores a user ID included in the posting information and a vehicle ID included in the vehicle information in a manner associated with each other;
a posting information acquisition part that acquires the posting information from an external server; and
a vehicle information acquisition part that acquires the vehicle information, including the travel history information, based on the vehicle ID associated with the user ID of the acquired posting information,
wherein the position information providing part provides the posting information with position information of the posting based on a position included in the travel history information identified by the identification part, and
wherein the position information providing part provides the posting information with position information of the posting based on the acquired posting information and the travel history information.

9. The position information providing apparatus according to claim 8, wherein, when the posted text includes a word that can be used to identify a place, the position information providing part conducts a search using the word that can be used to identify the place in map information and employs, as the position information of the posting, a position of a facility closest to a position included in the travel history information identified by the identification part from among facilities found by the search.

10. The position information providing apparatus according to claim 8, wherein the identification part identifies, from the vehicle information, the travel history information in which a vehicle stop time period from a time when an accessory power was turned OFF before the posting date and time corresponding to the posted text to a time when the accessory power was next turned ON is equal to or longer than a minimum dwell time that has been set so as to be associated with a behavior type classified based on the word related to the behavior included in the posted text, the minimum dwell time being a minimum time expected to be required for performing the behavior in a facility, and
wherein, when the posted text includes a word that can be used to identify a place, the position information providing part conducts a search using the word that can be used to identify the place in map information and employs, as the position information of the posting, a position of a facility closest to a position included in the travel history information identified by the identification part from among facilities found by the search.

11. The position information providing apparatus according to claim 8, wherein, when the posted text does not include a word that can be used to identify a place, the position information providing part conducts a search for a facility corresponding to a behavior type classified based on the word related to the behavior included in the posted text from map information and employs, as the position information of the posting, a position of a facility closest to a position included in the travel history information identified by the identification part from among facilities found by the search.

12. The position information providing apparatus according to claim 8, wherein the identification part identifies, from the vehicle information, the travel history information in which a vehicle stop time period from a time when an accessory power was turned OFF before the posting date and time corresponding to the posted text to a time when the accessory power was next turned ON is equal to or longer than a minimum dwell time that has been set so as to be associated with a behavior type classified based on the word related to the behavior included in the posted text, the minimum dwell time being a minimum time expected to be required for performing the behavior in a facility, and wherein, when the posted text does not include a word that can be used to identify a place, the position information providing part conducts a search for a facility corresponding to a behavior type classified based on the word related to the behavior included in the posted text from map information and employs, as the position information of the posting, a position of a facility closest to a position included in the travel history information identified by the identification part from among facilities found by the search.

* * * * *